United States Patent [19]
Wendler et al.

[11] 3,870,747
[45] Mar. 11, 1975

[54] INTERMEDIATES AND PROCESS FOR PROSTAGLANDIN SYNTHESIS

[75] Inventors: Norman L. Wendler, Summit; David Taub, Metuchen; Harry L. Slates, Westfield; Zbigniew S. Zelawski, Piscataway, all of N.J.

[73] Assignee: Merck & Co., Inc., Rahway, N.J.

[22] Filed: Nov. 24, 1971

[21] Appl. No.: 201,959

[52] U.S. Cl.... 260/468 G, 260/343.2 R, 260/346.3, 260/456 R, 260/456 P, 260/464, 260/468 D, 260/468 K, 260/514 D, 260/514 K, 260/617 R
[51] Int. Cl............................................ C07c 69/74
[58] Field of Search........ 260/468 K, 468 D, 514 K, 260/514 D

[56] References Cited
OTHER PUBLICATIONS
Schaefer et al., Organic Reactions, volume 15, pp. 16-21, (1967).
Schaefer et al., Organic Reactions, volume 15, pp. 3,9,22, (1967).
Taub et al., Chem. Comm., 1970, 1258.

*Primary Examiner*—Robert Gerstl
*Attorney, Agent, or Firm*—David L. Rose; J. Jerome Behan; Hesna J. Pfeiffer

[57] ABSTRACT

A precursor of prostaglandin $E_1$, racemic or optically active 3a,6,7,7a-tetrahydro-4-methyl-2-oxo-1β-indaneheptanoic acid loweralkyl ester, is synthesized from racemic or optically active precursors in good yield at the various steps from 3α-methyl-4-cyclohexene-1α,2α-dicarboxylic anhydride by a sequence of reactions proceding through 3α-methyl-4-cyclohexene-1α,2α-diacetic acid, 4α-hydroxy-3α-methyl-1α,2α-cyclohexene diacetic acid-δlactone, and 3-methyl-3-cyclohexene-1α,2α-diacetic acid dimethyl ester.

5 Claims, No Drawings

INTERMEDIATES AND PROCESS FOR PROSTAGLANDIN SYNTHESIS

BRIEF SUMMARY OF THE INVENTION

This invention relates to a new and novel synthesis of precursors of prostaglandin $E_1$ and particularly to the important intermediate 3α,6,7,7α-tetrahydro-4-methyl-2-oxo-1β-indaneheptanoic-acid loweralkyl ester and more particularly to a synthesis which has a high degree of stereoselectivity at the points of generating the asymmetric centers and resolution of one or more intermediates such that the biologically active stereoisomer of prostaglandin $E_1$ is totally synthesized. It relates further to a synthesis in which the yields are high in the several reaction steps. The invention relates still further to the novel compounds obtained as intermediates in the (±) and (−) prostaglandin $E_1$ syntheses and to the process for making such intermediates.

DETAILED DESCRIPTION OF THE INVENTION

Prostaglandin $E_1$, which may be depicted structurally as

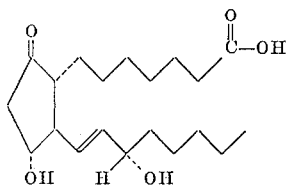

or

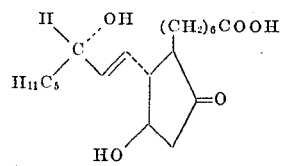

is one of a group of naturally occurring compounds known generally as prostaglandins. These prostaglandins have interesting and important biological activity, the precise biological properties varying with the individual members of the prostaglandin family, as described in the article Prostaglandins, by P. W. Ramwell, et al., Progress in the Chemistry of Fats and Other Lipids, Vol. IX, Polyunsaturated Acids, Part 2, pp. 231–273, Pergamon Press (1968).

One of the more important prostaglandins is prostaglandin $E_1$, also known as $PGE_1$. It has an effect on the contractility of smooth muscle and is useful in the induction of labor in pregnant females and for the termination of pregnancy by therapeutic abortion, M. P. Embrey, British Medical Journal, 1970, 2, 256–258; 258–260. Other uses, besides stimulation of smooth muscle, are described in the literature and include lowering of blood pressure, effect on mobilization of free fatty acids from adipose tissue, inhibition of lipolysis, and bronchodilating effect.

Heretofore, the supply of prostaglandin $E_1$, as well as of other prostaglandins, has been severely limited because only minute amounts of naturally occurring material are available, and partial biosynthesis by enzymes present in mammalian seminal vesicles has only afforded limited amounts of the products.

An object of this invention is to provide stereoselective total syntheses of a racemic precursor of (±) prostaglandin $E_1$, which compound has one-half the biological activity of the naturally occurring $PGE_1$, and an optically active precursor of (−) prostaglandin $E_1$, which compound has 100 percent of the biological activity of naturally occurring $PGE_1$ and which may be used for the same biological effects as the natural compounds.

A further object of the invention is to provide novel intermediate compounds some of which, in addition to being useful in the synthesis of (±) and (−) $PGE_1$, may themselves exhibit prostaglandin-like activity. An additional object is to provide a stereoselective total synthesis of other racemic or optically active members of the prostaglandin group which may be prepared by known methods from (±) and (−) prostaglandin $E_1$. Thus, for instance, (±) prostaglandin $F_{1\alpha}$ may be obtained by reduction of (±) $PGE_1$. Other objects will become evident from the following description of the invention.

The novel process and intermediates of our invention are shown structurally in the following flow diagram, and immediately following this diagram the chemcial names of the compounds are set forth.

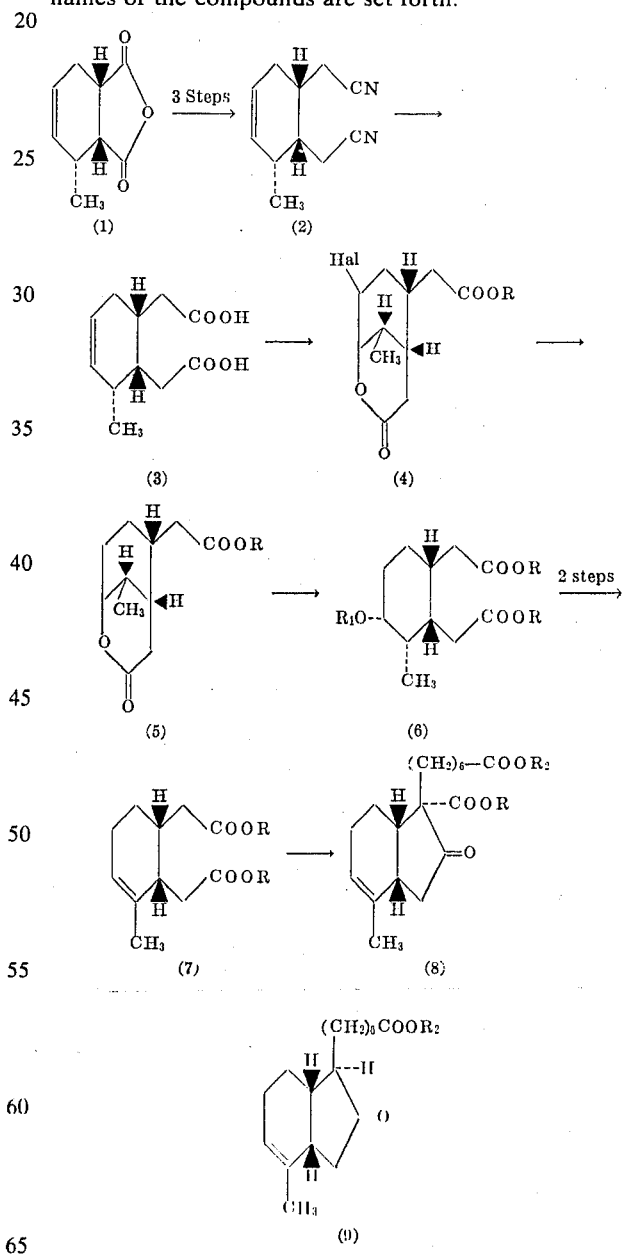

In the foregoing formulas R represents hydrogen or loweralkyl; $R_1$ represents hydrogen, loweralkylsulfonyl, or aralkylsulfonyl; $R_2$ represents loweralkyl or aralkyl and Hal represents a halogen. The loweralkyl groups of this invention are those containing from 1 to 6 carbon atoms such as methyl, ethyl, propyl, and hexyl. The term aralkyl defines those loweralkyl groups which are substituted with an aromatic hydrocarbon of from 6 to 10 carbon atoms. The loweralkyl group contains from 1 to 6 carbon atoms and the aromatic hydrocarbon preferably is the benzene ring. The preferred aralkyl group is the benzyl group. The term "halogen" can indicate any of the halogen atoms chlorine, bromine, or iodine.

As an alternate procedure in preparing compound 9 from compound 8 the following steps may be employed:

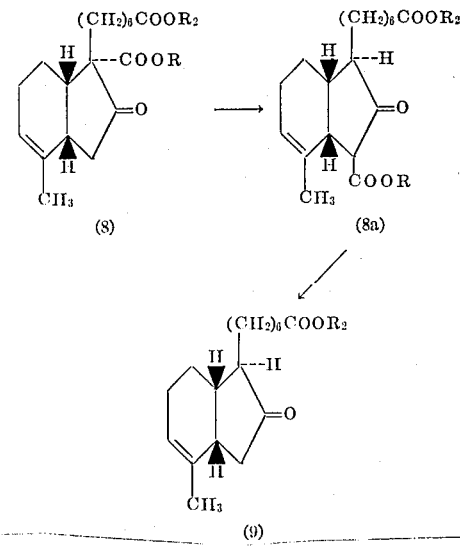

wherein R and $R_1$ are as previously defined.

As a matter of convenience for understanding the foregoing flowsheets and the following description of the invention, there follows a list of the names of the chemcial compounds 1–9 inclusive:

1. 3α-methyl-4-cyclohexene-1α, 2α-dicarboxylic anhydride,
2. 3α-methyl-4-cyclohexene-1α,2α-diacetonitrile,
3. 3α-methyl-4-cyclohexene-1α,2α-diacetic acid,
4. (R=H) 4α-hydroxy-5β-halo-3α-methyl-1α,2α-cyclohexanediacetic acid δ-lactone, 4. (R=CH$_3$) 4α-hydroxy-5β-halo-3α-methyl-1α,2α-cyclohexanediacetic acid methyl ester, δ-lactone,
5. (R=CH$_3$) 4α-hydroxy-3α-methyl-1α,2α-cyclohexanediacetic acid methyl ester, δ-lactone,
5. (R=H) 4α-hydroxy-3α-methyl-1α,2α-cyclohexanediacetic acid δ-lactone,
6. (R=R$_1$=H) 4α-hydroxy-3α-methyl-1α,2α-cyclohexanediacetic acid,
6. (R=CH$_3$, R$_1$=H) 4α-hydroxy-3α-methyl-1α,2α-cyclohexanediacetic acid dimethyl ester,
6. (R=CH$_3$, R$_1$=SO$_2$CH$_3$) 4α-hydroxy-3α-methyl-1α,2α-cyclohexanediacetic acid, dimethyl ester, methylsulfonate,
7. (R=CH$_3$) 3-methyl-3-cyclohexene-1α,2α-diacetic acid dimethyl ester,
8. (R$_2$=R=CH$_3$) 3a,6,7,7a-tetrahydro-1α-(methoxycarbonyl)-4-methyl-2-oxoindaneheptanoic acid methyl ester,
8a. (R$_2$=R=CH$_3$) 3α,6,7,7α-tetrahydro-3α-(methoxycarbonyl)-4-methyl-2-oxo-1β-indaneheptanoic acid methyl ester,
9. (R$_1$=R$_2$=CH$_3$) 3a,6,7,7a-tetrahydro-4-methyl-2-oxo-1β-indaneheptanoic acid methyl ester.

In the foregoing list of names and in subsequent discussions, the esters have been referred to as methyl esters because the detailed examples refer to such esters but it is to be understood that other esters, and preferably loweralkyl and aralkyl esters, are within the scope of the invention as shown by the symbols R and $R_2$ in the flow diagram.

In the first step of our invention 3α-methyl-4-cyclohexene-1α,2α-dicarboxylic anhydride (1) is reduced to 3α-methyl-4-cyclohexene-1α,2α-dimethanol. Any reducing agent capable of reducing an anhydride ring can be used, however, lithium aluminum hydride is preferred. The reaction is carried out in an anhydrous inert solvent not susceptible to attack by the reducing agent such as tetrahydrofuran. The reaction is generally complete in from 1 to 10 hours at the reflux temperature of the reaction mixture. The 3α-methyl-4-cyclohexene-1α,2α-dimethanol is treated with an aryl or alkylsulfonyl chloride which in turn is treated with an alkali metal cyanide affording 3α-methyl-4-cyclohexene-1α,2α-diacetonitrile (2). The aryl or alkyl sulfonyl group should be a sufficiently good leaving group such that on treatment with the alkali metal cyanide, the diacetonitrile compound (2) is readily formed. The p-tolyl, and p-bromo-phenyl and methyl sulfonyl groups are preferred. The sulfonylation reaction is generally run in a basic medium such as an inert solvent with added base or a solvent basic in itself. Tetrahydrofuran, benzene, toluene, and the like with triethyl amine or pyridine dissolved therein afford satisfactory results. Optimum results are obtained when pyridine is the reaction solvent. Two molecular equivalents of the aryl or alkylsulfonyl chloride are required, however, yields are improved when an excess of from 10 to 100 percent is employed. The reaction is generally complete in from 5 to 24 hours at a temperature of from -15° to 25°. The 3α-methyl-4-cyclohexene-1α,2α-dimethanol di-(aryl or alkyl) sulfonate is treated at from 50° to 100°C. for from 10 to 25 hours with an alkali metal cyanide preferably sodium cyanide in an aprotic solvent such as dimethylsulfoxide or dimethylformamide affording compound 2.

The dinitrile is hydrolyzed with an aqueous base at from 50° to the reflux temperature of the reaction medium for from 3 to 12 hours, affording 3α-methyl-4-cyclohexene-1α, 2α-diacetic acid (3). Concentrated aqueous solutions of strong bases such as an alkali metal hydroxide are preferred, although any base, including a quaternary organic base, which is as strong as the aforementioned may be used.

The 3α-methyl-4-cyclohexene-1α,2α-diacetic acid, (3) in a concerted reaction, is halogenated and lactonized with a halogenating agent such as N-bromosuccinimide or iodine and potassium iodide, and the like, in the presence of a base such as an alkali metal carbonate or bicarbonate. The reaction produces 4α-hydroxy-5β-halo-3α-methyl-1α,2α-cyclohexane diacetic acid δ-lactone (4,R=H) in from 2 to 12 hours at from 15° to 40°C. It has been found that superior results are obtained when the reaction mixture is protected from light during the reaction period.

The free acid of compound 4 is then esterified to 4α-hydroxy-5β-halo-3α-methyl-1α,2α-cyclohexanediacetic acid loweralkyl or aralkyl ester, δ-lactone (4) using esterification procedures known to those skilled in this art. However, in order to insure against undue decomposition, mild esterification reaction conditions are preferred. For this purpose there is employed a diazoloweralkane or a diazoaralkane in ether, tetrahydrofuran or a loweralkanol. Ethereal diazomethane is preferred. The reaction is run at from -20° to 20°C. for from 5 to 20 minutes, generally employing an excess of the diazo reagent in either a loweralkanol or ether.

The halo ester of compound 4 is dehalogenated using chromium diacetate in a polar solvent as dimethylsulfoxide or dimethylformamide and at least one molar equivalent of a loweralkyl mercaptan. The chromium diacetate reductively removes the halogen atom from the cyclohexane ring leaving a radical at that position which abstracts a proton from the mercaptan forming $4\alpha$-hydroxy-$3\alpha$-methyl-$1\alpha$,$2\alpha$-cyclohexane acetic acid methyl ester, $\delta$-lactone (5, $R=CH_3$). The reaction is generally complete in from ¼ to 3 hours at from 15° to 40°C. In practice it has been found that up to a 5 fold excess of the loweralkyl mercaptan can be employed successfully with even higher amounts having no apparent deleterious effects.

Alternatively the halo ester of compound 4 is dehalogenated using hydrogenation techniques. Raney Nickel and hydrogen at atmospheric pressure or pressures up to 3 atmospheres, at a temperature of about room temperature are generally satisfactory. Loweralkanols are preferred solvents for this reaction which also contains at least one equivalent of a buffering agent such as an alkali metal acetate, which neutralizes the liberated hydrohalic acid and maintains the pH of the reaction medium approximately neutral.

The ester $5(R=CH_3)$ is hydrolyzed to $4\alpha$-hydroxy-$3\alpha$-methyl-$1\alpha$,$2\alpha$-cyclohexanediacetic acid, $\delta$-lactone (5, $R=H$) using mild hydrolysis techniques known to those skilled in the art. Aqueous alkali metal hydroxides are preferred, such as sodium or potassium hydroxide, at about room temperature for from ½ to 4 hours. The initially inhomogeneous suspension becomes a homogeneous solution when the saponification is complete.

The next step involves the hydrolysis of the lactone ring of compound $5(R=H)$ also using an alkali metal hydroxide in aqueous solution to obtain compound $6(R=R_1=H)$. The hydrolysis of the lactone is run at a temperature of from 60° to 100°C. for from 1 to 4 hours forming $4\alpha$-hydroxy-$3\alpha$-methyl-$1\alpha$,$2\alpha$-cyclohexanediacetic acid. This reaction and the previous reaction could be run in a concerted fashion, however, it is preferred to isolate compound $5(R=H)$ for purposes of resolving the racemic mixture into optically pure stereoisomers as described hereinbelow.

Compound $6(R=R_1=H)$ is esterified with a diazoloweralkane or a diazoaralkane as previously described affording the diester of compound $6(R_1=H)$. The racemic or optically active diester (6, $R=CH_3$, $R_1=H$) as prepared above is dehydrated to 3-methyl-3-cyclohexene-$1\alpha$,$2\alpha$-diacetic acid dimethyl ester (7, $R=CH_3$) by forming the loweralkylsulfonyl or aralkylsulfonyl derivative of the $3\alpha$-hydroxy group of compound 6 ($R=CH_3$, $R_1=H$) and eliminating the substituted sulfonic acid, forming compound $7(R=CH_3)$. The sulfonyl derivative is formed by treating compound $6(R=CH_3, R_1=H)$ with an appropriately substituted sulfonyl chloride in a basic medium such as pyridine or an inert solvent containing pyridine or another base such as a tertiary amine. The solvents and base employed should be anhydrous to prevent reactions between the sulfonylchloride and water. The reaction is run at from -20° to 10°C. for a duration of from ½ to 24 hours. The loweralkylsulfonyl or aralkylsulfonyl intermediate solution is concentrated, combined with a high-boiling polar solvent, as dimethyl sulfoxide or pyridine and heated at from 75° to 150°C. for from 3 to 10 hours affording compound $7(R=CH_3)$.

Compound $7(R=CH_3)$ is cyclized with a Dieckmann ring closure and substituted with the heptanoic ester group at the 1-position by treatment with a strong base such as an alkali metal loweralkoxide and subsequent treatment with an $\omega$-iodoheptanoic acid loweralkyl or aralkyl ester. At least one molecular equivalent of the alkali metal loweralkoxide, preferably potassium tertiary butoxide, in a high boiling solvent such as xylene, dimethylformamide and the like is combined with compound $7(R=CH_3)$ and heated at from 50° to the boiling point of the reaction mixture for from ½ to 3 hours. The iodoheptanoic ester is then added and the reaction mixture heated at from 100°–200°C. for from 10 to 30 hours affording 3a,6,7,7a-tetrahydro-$1\alpha$-(methoxycarbonyl)-4-methyl-2-oxoindaneheptanoic acid methyl ester $8(R=R_2=CH_3)$.

Compound $8(R_2=R=CH_3)$ is treated with lithium iodide in a high boiling aromatic amine such as 2, 4, 6-collidine, which displaces the $\alpha$-methoxycarbonyl group, substituting therefor an $\alpha$-hydrogen atom. The product formed is 3a,6,7,7a-tetrahydro-4-methyl-2-oxo-$1\beta$-indaneheptanoic acid (9, $R_2=H$). The reaction is run at the reflux temperature of the solvent, at least from 150° to 200°C., for a duration of from 4 to 20 hours. The free acid (9, $R_2=H$) is formed which is converted to the desired ester with an appropriate diazoalkane or aralkane reagent using the process described hereinabove.

Alternatively, compound 9 in either racemic or optically active form may be prepared in a series of steps in which compound 8 is first rearranged by treatment with an alkali metal alkoxide in a polar solvent such as a lower-alkanol, preferably methanol. Subsequently the rearranged compound $8a(R=R_2=CH_3)$ is saponified with an alkali metal hydroxide aqueous solution. Both reactions are run at from room temperature to the reflux temperature of the solvent employed for from 1 to 5 hours. The saponification product is then thermally decarboxylated in an inert aromatic solvent such as toluene, xylene and the like at a temperature of from 100° to 200°C. for from 1 to 6 hours. The saponification of the methoxycarbonyl group is usually accompanied by hydrolysis of the heptanoic ester side chain which requires reesterification with excess diazoloweralkane or diazoaralkane as described hereinabove, affording 3a,-6,7,7a-tetrahydro-4-methyl-2-oxo-$1\beta$-indaneheptanoic acid methyl ester (9 $R_2=CH_3$).

In the above reaction sequence 1 → 9 to the racemic form of the critical intermediate (9) is formed. However, an important aspect of this invention is the formation of the optically active intermediate (9) such that the optically active enantiomer of prostaglandin $E_1$ can be formed. This is done by resolving one of the intermediates in the series into its optically active form and carrying out the remainder of the synthetic steps on the resolved material. Care must be taken not to racemize the resolved material by attacking any of the optical centers. The synthetic scheme described hereinabove does not permit racemization of the optically active intermediates and the optical activity of compound 9 is preserved. It has been found that in the synthetic series 1-9 there are two compounds which are readily resolved; they are the initial starting material (1) and the lactonic acid (5, R=H).

In order to resolve at the first stage of our process 3α-Methyl-4-cyclohexene-1α,2α-diacarboxylic anhydride (1) is treated with an alkali metal alkoxide in a loweralkanol to open the anhydride ring and prepare the 2-acid-1-ester derivative. The dehydroabietyl amine salt of this acid ester is prepared in a polar organic solvent such as acetone or a loweralkanol. The salt of the (−) acid ester precipitates initially and is collected and purified by recrystallization. This salt can be reconverted to the (−) acid ester by treatment with an inorganic base such as an alkali metal carbonate or bicarbonate, and further treated with an alkali metal dihydrogen phosphate to form the free (−) acid ester from the alkali metal salt thereof. The resolved (−) acid ester is then treated with a reducing agent to form compound 2 using the same process described above wherein compound 1 is reduced.

In addition, the abietylamine salt solution may be further fractionated to afford the abietylamine salt of the (+) acid ester which is purified and converted to the (+) acid ester as described above.

4α-Hydroxy-3α-methyl-1α,2α-cyclohexanediacetic acid δ-lactone (5, R=H) is resolved by preparing a salt with (+) dehydroabietyl amine. The lactonic acid is dissolved in the minimum amount of a non-polar organic solvent such as benzene or a halogenated hydrocarbon as chloroform or carbon tetrachloride, and combined with one equivalent of (+) dehydroabietylamine. The salt of the (+) acid initially precipitates requiring from 1 to 24 hours at from 0° to 40°C. for completion. Concentrations of the mother liquors affords fractions of crystals enriched in the salt of the (−) acid. Recrystallization affords optically pure salts which are converted to the optically pure (+) or (−) acids by treatment with a mild base such as an alkali metal carbonate or bicarbonate affording the alkali metal salt of the optically pure free acid. The alkali metal salt is treated with an acid such as an alkali metal dihydrogen phosphate, liberating the optically pure free acid.

The optically active intermediates are then employed in the reaction sequence affording the critical intermediate 9 in optically active form. Only one resolution need be performed in any particular synthetic sequence. Thus if the starting material (1) is resolved, intermediate 5(R=H) need not be resolved. Intermediate 5(R=H) is resolved only if racemic (1) is employed as the starting material.

The racemic or optically active 3α,6,7,7α-tetrahydro-4-methyl-2-oxo-1β-indaneheptanoic acid methyl ester may be converted to the racemic or optically active Prostaglandin E$_1$ in a series of synthetic steps described in U.S. Pat. application Ser. No. 201,979 filed on even date herewith.

In order that this invention might be more fully understood the following examples are included. The examples should be construed as exemplary of one mode of operating this invention, and not a limitation on other modes.

EXAMPLE 1

3αMethyl-4-cyclohexene-1α,2α-dimethanol

A solution of 25 g. of (±) -3α-methyl-4-cyclohexene-1α,3α-dicarboxylic anhydride in 140 ml. of dry tetrahydrofuran is added to a suspension of 10.5 g. of lithium aluminum hydride in 140 ml. of tetrahydrofuran at such a rate as to maintain a gentle reflux. When the addition is complete the reaction mixture is refluxed for 3 hours and allowed to cool overnight. The complex is decomposed by the careful addition of 100 ml. of 1:1 tetrahydrofuran/water mixture to the reaction mixture at 0°C. 150 Ml. of chloroform is added, the reaction mixture is filtered, and the filter cake washed with chloroform. The combined filtrates are concentrated to dryness in vacuo. The residue is dissolved in benzene, dried with magnesium sulfate, and evaporated affording 22.4 g. of (±) 3α-methyl-4-cyclohexene-1α,2α-dimethanol as a colorless solid (m.p. 47°–49.5°).

When in the above procedure the resolved acid/ester (−) 3α-methyl-4-cyclohexene-1α,2α-dicarboxylic acid 1-methyl ester is employed in place of 3α-methyl-4-cyclohexene-1α,3α-dicarboxylic anhydride there is obtained (−) 3α-methyl-4-cyclohexene-1α,2α-dimethanol $[\alpha]_D$ CHCl$_3$ −26°.

EXAMPLE 2

3αMethyl-4-cyclohexene-1α,2α-dimethanol-di-p-toluenesulfonate

To a solution of 10 g. (0.064 moles) of (±) 3α-methyl-4-cyclohexene-1α,2α-dimethanol in 30.4 g. of dry pyridine at −15°C. is added 26.83 g. (0.141 moles, 10 percent excess) of recrystallized p-toluenesulfonylchloride in portions at such a rate that the temperature does not exceed −5°C. The reaction mixture is stirred for 2 hours at −15° and stored overnight at 4°C. The reaction mixture is then poured slowly onto 250 cc of an ice/water mixture with stirring. The aqueous mixture is aged at 0° to 5°C. for 20 minutes and the aqueous layer decanted from the semi-solid precipitate. The solid material is dissolved in chloroform and the chloroform solution is washed with dilute hydrochloric acid at 0°C., water, dilute aqueous potassium bicarbonate, water again, and finally with saturated aqueous sodium chloride. The chloroform solution is dried with magnesium sulfate and evaporated to dryness affording 27.7 g. of a viscous oil which crystallizes on dilution with ether. The product, (±) 3α-methyl-4-cyclohexene-1α,2α-dimethanol- di-p-toluene-sulfonate has a m.p. 62.5°–65°C.

When in the above procedure (−) 3α-methyl-4-cyclohexene-1α,2α-dimethanol is employed in place of the racemic mixture there is obtained (−) 3α-methyl-4-cyclohexene-1α,2α-dimethanol di-p-toluene sulfonate, m.p. 52°–54°C. $[\alpha]_D$ CHCl$_3$−12°.

EXAMPLE 3A

3α-Methyl-4-cyclohexene-1α,2α-diacetonitrile

A suspension of 1 g. of sodium cyanide and 10 ml. of dried dimethylsulfoxide is heated under nitrogen to 80°–85°C. 2.37 G. of (±) 3α-methyl-4-cyclohexene-1α,2α-dimethanol di-p-toluenesulfonate is added in 3 portions over 15 minutes and the reaction mixture heated at 90°–95°C. for 18 hours. The reaction mixture is cooled and diluted with 6 volumes of saturated sodium chloride solution. The aqueous mixture is extracted with methylene chloride, dried with magnesium sulfate, and evaporated to dryness in vacuo affording 0.781 g. of (±) 3α-methyl-4-cyclohexene-1α,2α-diacetonitrile which is obtained as an oil.

EXAMPLE 3B

3α-Methyl-4-cyclohexene-1α,2α-diacetonitrile

A suspension of 14.7 g. of sodium cyanide and 140 ml. of dried dimethylsulfoxide is heated under nitrogen to 80°–85°C. 27.7 g. of (±) 3α-methyl-4-cyclohexene-1α,2α-dimethanol di-p-toluenesulfonate is added in 3 portions over 15 minutes and the reaction mixture heated at 90°–95°C. for 18 hours. The reaction mixture is cooled and diluted with 6 volumes of saturated sodium chloride solution. The aqueous mixture is extracted with methylene chloride; the extracts washed with saturated sodium chloride, dried with magnesium sulfate, and evaporated to dryness in vacuo affording 10.04 g. (96 percent) of (±) 3α-methyl-cyclohexene-1α,2α-diacetonitrile which is obtained as an oil.

When in the above procedure (−) 3α-methyl-4-cyclohexene-1α,2α-dimethanol di-p-toluenesulfonate is employed in place of the racemic mixture there is obtained (−) 3α-methyl-4-cyclohexene-1α,2α-diacetonitrile which is obtained as an oil.

EXAMPLE 4

3α-Methyl-4-cyclohexene-1α,2α-diacetic acid 81.7 G. of (±) 3α-methyl-4-cyclohexene-1α,2α-diacetonitrile is suspended in 700 ml. of 33 percent aqueous potassium hydroxide and refluxed for 7 hours. After standing overnight at room temperature, the reaction mixture is treated with charcoal, extracted with ether, and acidified with concentrated HCl affording a solid precipitate weighing 92 g. The solid material is recrystallized from acetone/ethylacetate affording 67 g. of (±) 3α-methyl-4-cyclohexene-1α,2α-diacetic acid, m.p. 148°–151°C.

When in the above procedure (−) 3α-methyl-4-cyclohexene-1α,2α-diacetonitrile is employed in place of the racemic mixture, there is obtained (−) 3α-methyl-4-cyclohexene-1α,2α-diacetic acid, m.p. 98.5°–100°C., $[α]_D$ CHCl$_3$, −55°.

EXAMPLE 5

4α-Hydroxy-5β-iodo-3α-methyl-1α,2α-cyclohexanediacetic acid δ-lactone 12.8 G. of (±) 3α-methyl-4-cyclohexene-1α,2α-diacetic acid is dissolved in 150 ml. of water containing 36 g. of potassium bicarbonate. A solution of 30.68 g. of iodine and 65.21 g. of potassium iodide in 181 ml. of water is added with stirring. The reaction mixture is stirred for 3.5 hours in the dark, decolorized with saturated aqueous sodium bisulfite, acidified with 2.5 N hydrochloric acid, and extracted with ethyl acetate. The extracts are washed with an aqueous saturated sodium chloride solution containing a small amount of sodium bisulfite, and evaporated to dryness affording 20.04 g. of (±) 4α-hdroxy-5β-iodo-3α-methyl-1α,2α-cyclohexanediacetic acid δ-lactone m.p. 150°–152°C.

When in the above procedure (−) 3α-methyl-4-cyclohexenediacetic acid is employed in place of the racemic mixture, there is obtained (−) 4α-hydroxy-5β-iodo-3α-methyl-1α,2α-cyclohexanediacetic acid δ-lactone, m.p. 170°(dec) $[α]_D$ CHCl$_3$ −3°.

Example 6

4α-Hydroxy-5β-iodo-3α-methyl-1α,2α-cyclohexanediacetic acid δ-lactone methyl ester 10.0 G. of (±) 4α-hydroxy-5β-iodo-3α-methyl-1α,2α-cyclohexanediacetic acid δ-lactone is dissolved in the minimum amount of methanol and cooled to 0°C. Ethereal diazo methane is added dropwise maintaining the temperature at 10°C. or less until a yellow color persists in the reaction medium. The solvents are evaporated in vacuo and the residue recrystallized from ethanol affording (±) 4α-hydroxy-5β-iodo-3α-methyl-1α,2α-cyclohexanediacetic acid δ-lactone methyl ester m.p. 80°–82°C.

When in the above procedure (−) 4α-hydroxy-5β-iodo-3α-methyl-1α,2α-cyclohexanediacetic acid -δ-lactone is employed in place of the racemic mixture, there is obtained optically active 4α-hydroxy-5β-iodo-3α-methyl-1α,2α-cyclohexanediacetic acid δ-lactone, methyl ester an an oil.

Example 7

4α-Hydroxy-3α-methyl-1α,2α-cyclohexanediacetic acid methyl ester, δ-lactone

To 68 G. of freshly prepared chromium diacetate dispersed in 250 ml. of dry dimethylsulfoxide containing 40 ml. of ethylmercaptan is added a solution of 20 g. of (±) 4α-hydroxy-5β-iodo-3α-methyl-1α,2α-cyclohexanediacetic acid δ-lactone methyl ester in 60 ml. of dimethylsulfoxide over 10 minutes. The reaction mixture is stirred at room temperature for 1 ¼ hours and diluted with 600 ml. of ice water. The reaction mixture is acidified with 250 ml. of 2.5 N hydrochloric acid. The solution is further diluted with 600 ml. of water and extracted with methylene-chloride. The combined extracts are washed with water until the extracts are colorless and then washed with saturated sodium chloride solution. The organic layer is dried with magnesium sulfate and evaporated to dryness. The residue is recrystallized from benzene affording 12.5 g. of (±) 4α-hydroxy-3α-methyl-1α,2α-cyclohexanediacetic acid methyl ester δ-lactone m.p. 83°–84°C.

When in the above procedure (−) 4α-hydroxy-5β-iodo-3α-methyl-1α,2α-cyclohexanediacetic acid, δ-lactone, methyl ester is employed in place of the racemic mixture there is obtained (−) 4α-hydroxy-3α-methyl-1α,2α-cyclohexanediacetic acid methyl ester, δ-lactone as an oil $[α]_D$ CHCl$_3$ -48°.

Example 8

4α-Hydroxy-3α-methyl-1α,2α-cyclohexanediacetic acid δ-lactone

32 G. (0.14 moles) of (±) 4α-hydroxy-3α-methyl-1α,2α-cyclohexanediacetic acid methyl ester, δ-lactone is saponified by stirring under nitrogen at room temperature for 1 hour with 15.84 g. (0.28 moles) of potassium hydroxide in 283 ml. of water. The resulting solution is extracted with ether, acidified with 2.5 N hydrochloric acid, and extracted with ethyl acetate. The combined extracts are washed with aqueous Na$_2$S$_2$O$_3$ solution, and saturated sodium chloride solution, and dried over magnesium sulfate. The organic solution is evaporated to dryness affording 27.52 g. of (±) 4α-hydroxy-3α-methyl-1α,2α-cyclohexanediacetic acid δ-lactone m.p. 135°–139°. Following recrystallization from an acetone/ether mixture, the m.p. is raised to 138°–140°C.

When in the above procedure (−) 4α-hydroxy-3α-methyl-1α,2α-cyclohexanediacetic acid methyl ester, δ-lactone is employed in place of the racemic mixture there is obtained (−) 4α-hydroxy-3α-methyl-1α,2α-cyclohexanediacetic acid, δ-lactone m.p. 118°–120.5°C., $[α]_D$ CHCl$_3$ -55°.

Example 9

4α-Hydroxy-3α-methyl-1α,2α-cyclohexanediacetic acid

A mixture of 7.0 g. of (±) 4α-hydroxy-3α-methyl-1α,2α-cyclohexanediacetic acid δ-lactone in 70 ml. of water with 14 g. of potassium hydroxide is heated on a steam bath under nitrogen for 2.5 hours. The gaseous carbon dioxide is passed through the solution until the pH is 8.0. The reaction mixture is then acidified to a pH of 2 with dilute hydrochloric acid and extracted with ethyl acetate affording 8.32 g. of (±) 4α-hydroxy-3α-methyl-1α,2α-cyclohexanediacetic acid m.p. 151°–153°C.

When in the above procedure (−) 4α-hydroxy-3α-methyl-1α,2α-cyclohexanediacetic acid, δ-lactone is employed in place of the racemic mixture, there is obtained (−) 4α-hydroxy-3α-methyl-1α,2α-cyclohexanediacetic acid $[\alpha]_D$ CHCl$_3$ -66°.

Example 10

4α-Hydroxy-3α-methyl-1α,2α-cyclohexanediacetic acid dimethyl ester

Following the procedure of Example 6 employing 10.0 g. of (±) 4α-hydroxy-3α-methyl-1α,2α-cyclohexanediacetic acid there is obtained (±) 4α-hydroxy-3α-methyl-1α,2α-cyclohexanediacetic acid dimethyl ester.

When in the above procedure (−) 4α-hydroxy-3α-methyl-1α,2α-cyclohexanediacetic acid is employed in place of the racemic mixture there is obtained (−) 4α-hydroxy-3α-methyl-1α,2α-cyclohexanediacetic acid dimethyl ester.

Example 11

4α-Hydroxy-3α-methyl-1α,2α-cyclohexanediacetic acid dimethyl ester methanesulfonate To a stirred solution of 28.95 ml. of methane sulfonyl chloride in 50 ml. of dry pyridine at 0°C. is added a solution of 11 g. of 4α-hydroxy-3α-methyl-1α,2α-cyclohexanediacetic acid dimethyl ester in 86 ml. of dry pyridine dropwise. The reaction mixture is stirred for ½ hour at 0°C. and allowed to stand overnight at 0°C. The reaction is poured onto ice-water and extracted with chloroform. The combined extracts are acidified with dilute HCl at 0°C. and washed with water, potassium bicarbonate solution, water, and saturated sodium chloride solution. The organic layer is dried with magnesium sulfate and evaporated to dryness affording 14.4 g. of 4α-hydroxy-3α-methyl-1α,2α-cyclohexanediacetic acid dimethyl ester methanesulfonate obtained as an oil.

Example 12

3-Methyl-3-cyclohexene-1α,2α-diacetic acid dimethyl ester

A solution of 14 g. of 4α-hydroxy-3α-methyl-1α,2α-cyclohexanediacetic acid dimethyl ester methanesulfonate is 168 ml. of dry dimethyl sulfoxide is heated at 102°–104°C. under nitrogen with stirring for 6 ¼ hours. The reaction mixture is cooled, combined with ice water, and extracted with hexane. The combined extracts are washed successively with 4 portions of water and 1 portion of saturated sodium chloride solution. The hexane layer is dried with magnesium sulfate and evaporated to dryness in vacuo affording 8.5 g. of (±) 3-methyl-3-cyclohexene-1α,2α-diacetic acid dimethyl ester obtained as an oil.

Example 13

3-Methyl-3-cyclohexene-1α,2α-diacetic acid dimethyl ester 7.667 of (±) 4α-hydroxy-3α-methyl-1α,2α-cyclohexanediacetic acid dimethyl ester in 16 ml. of dry benzene is added dropwise, at 0°, to a stirred solution of 3.95 g. of methanesulfonyl chloride in 77 ml. of dry pyridine. After storing the mixture overnight at 0°, it is stirred at room temperature for 6 hours followed by heating at 100°–105° for 16 hours. The mixture is well chilled, diluted with hexane and acidified to pH with 6 N hydrochloric acid. After separation of the two phases the aqueous layer is reextracted with hexane-benzene mixture. The combined extracts are washed with water, potassium bicarbonate solution, and saturated sodium chloride solution, and dried over magnesium sulfate. The solution is evaporated to dryness affording 6.78 g. of (±) 3-methyl-3-cyclohexene-1α,2α-diacetic acid dimethyl ester as an oil.

When in Examples 11 and 13 (−) 4α-hydroxy-3α-methyl-1α,2α-cyclohexanediacetic acid, dimethyl ester is employed in place of the racemic mixture there is obtained (−) 3-methyl-3-cyclohexene-1α,2α-diacetic acid dimethyl ester as an oil.

Example 14

3-Methyl-3-cyclohexene-1α,2α-diacetic acid

A mixture of 0.2403 g. of (±) 3-methyl-3-cyclohexene-1α,2α-diacetic acid dimethyl ester, 2 ml. of methanol, 2.5 ml. of water, and 0.48 g. of potassium hydroxide is stirred under nitrogen at room temperature overnight. Excess methanol is removed in vacuo and the basic aqueous medium extracted with ether, cooled, acidified with 2.5 N hydrochloric acid, to pH 4 salted out, and extracted with ethyl acetate. Combined extracts after washing with saturated sodium chloride solution, drying over magnesium sulfate and evaporating to dryness afforded 0.1894 g. of solid acid, which on recrystallization from ether-hexane mixture had m.p. 121°–122.5°C.

When in the above procedure (−) 3-methyl-4-cyclohexene-1α,2α-diacetic acid, dimethyl ester is employed in place of the racemic mixture there is obtained (−) 3-methyl-3-cyclohexene-1α,2α-diacetic acid m.p. 102.5°–104°C $[\alpha]_D$ CHCl$_3$ −99.6°.

The above (±) or (−) diacid is converted to the corresponding diester using the procedure of Example 6.

Example 15

3α,6,7,7α-Tetrahydro-1α-(methoxycarbonyl)-4-methyl-2-oxoindaneheptanoic acid methyl ester Under an anhydrous and inert atmosphere 36.83 ml. of 0.565 M potassium-t-butoxide in dry t-butanol is evaporated to a white powdery residue under reduced pressure. The dry powder is dispersed in 50 ml. of dry xylene. 5 G. of (±) 3-methyl-3-cyclohexene-1α,2α-diacetic acid dimethyl ester in 40 ml. of xylene is added to the above dispersion dropwise. The reaction mixture is brought to reflux with the simultaneous removal by distillation of the lower boiling components. Refluxing at the temperature of boiling xylene is then continued for 2 hours. 45 Ml. of excess xylene is distilled off and 6.18 g. (10 percent molar excess) of methyl-7-iodoheptanoate in 5 ml. of xylene is added. The reaction mixture is refluxed for 16 hours, cooled, and diluted with benzene. Solid potassium iodide is removed by filtration recovering 99 percent of theory. The clear organic filtrate is washed with saturated sodium chloride, dried over magnesium sulfate, and evaporated to dryness affording 7.3 g. of 3α,6,7,7α-tetrahydro-1α-(methoxycarbonyl)-4-methyl-2-oxoindaneheptanoic acid methyl ester which is used as is in the next reaction.

When in the above procedure (−) 3-methyl-3-cyclohexene-1α,2α-diacetic acid dimethyl ester is employed in place of the racemic mixture there is obtained (−) 3α,6,7,7α-tetrahydro-1α-(methoxycarbonyl)-4-methyl-2-oxoindaneheptanoic acid methyl ester.

Example 16

3α,6,7,7α-tetrahydro-4-methyl-2-oxo-1β-indaneheptanoic acid methyl ester

A stirred mixture of 7.3 g. of (±) 3α,6,7,7α-tetrahydro-1α-(methoxycarbonyl)-4-methyl-2-oxoindaneheptanoic acid methyl ester and 21.27 g. of lithium iodide dihydrate in 120 ml. of s-collidine under a nitrogen atmosphere is refluxed for 11 hours. The reaction mixture is evaporated and concentrated in a high vacuum to remove the s-collidine. The residue is dispersed in ethyl acetate and acidified with 2.5 N hydrochloric acid and salted out with solid sodium chloride. The organic layer is separated and washed with saturated sodium chloride solution. The combined aqueous layers are reextracted with ethyl acetate and the combined ethyl acetate extracts dried over a magnesium sulfate affording the heptanoic acid intermediate. The acid is dissolved in a minimum amount of methanol and treated with excess ethereal diazomethane as in Example 6 affording 6.5 g. of (±) 3α,6,7,7α-tetrahydro-4-methyl-2-oxo-1β-indaneheptanoic acid methyl ester.

When in the above procedure (−) 3α,6,7,7α-tetrahydro-1α-(methoxycarbonyl)-4-methyl-2-oxoindaneheptanoic acid, methyl ester is employed in place of the racemic mixture there is obtained (±) 3α,6,7,7α-tetrahydro-4-methyl-2-oxo-1β-indaneheptanoic acid, methyl ester $[\alpha]_D$ CHCl$_3$ ±11.6°.

Example 17

Resolution of 3α-methyl-4-cyclohexene-1α-2α-dicarboxylic acid-1-methyl ester 4.98 G. (0.03 moles) of (±) 3α-methyl-4-cyclohexene-1α,2α-dicarboxylic anhydride is dissolved in 100 ml. of anhydrous methanol and cooled to 0°C. The reaction mixture is treated with 20 ml. of 1.35 N sodium methoxide in methanol. The methanol is evaporated in vacuo, the residue is acidified with sodium dihydrogen phosphate, and the (±) 3α-methyl-4-cyclohexene-1α,2α-dicarboxylic acid-1-methyl ester extracted with ether, dried, evaporated, and recrystallized from ether yielding 3.15 g. m.p. 110°-112°C. The acid ester is resolved by treating 0.594 g. (0.003 moles) in 10 ml. of ether with 0.856 g. of (+) dehydroabietylamine in 10 ml. of ether. The precipitated solid is recrystallized from acetone affording 0.53 g. of a salt m.p. 163°-165°C. The salt is converted to the free acid by extracting a suspension of the salt in ether/ethyl acetate with aqueous sodium bicarbonate. The aqueous solution of the sodium salt of the acid is treated with sodium dihydrogen phosphate precipitating the free acid.

The solid material is dried affording (−) 3α-methyl-4-cyclohexene-1α,2α-dicarboxylic acid-1-monomethyl ester m.p. 60°-61°C. $[\alpha]_D$ CHCl$_3$ −69°.

The mother liquor of the initially precipitated salt is concentrated causing the additional precipitation of a salt m.p. 143°-145°C. which on treatment above afforded (+) 3α-methyl-4-cyclohexene-1α,2α-dicarboxylic acid-1-monomethyl ester $[\alpha]_D$ CHCl$_3$ ±67.7°.

The above acid ester is reduced following the procedure of Example 1 affording 3α-methyl-4-cyclohexene-1α,2α-dimethanol in optically active form.

Example 18

Resolution of 4α-hydroxy-3α-methyl-1α,2α-cyclohexanediacetic acid δ-lactone 53.95 G. of (±) 4α-hydroxy-3α-methyl-1α,2α-cyclohexanediacetic acid δ-lactone is dissolved in the minimum amount of chloroform (150 ml.) and a solution of 79 g. of (+) dehydroabietylamine in 300 ml. of benzene is added. Crystallization occurs overnight yielding 59.94 g. of fine crystals m.p. 158°-167°C. Partial concentration of the mother liquor and dilution with ether yields a second crop of 26.7 g. of crystals m.p. 144°-148°C. Recrystallization of the second crop of crystals from methanol/ether affords 20.1 g. of fine crystals m.p. 148°-150°C. The recrystallized salt is suspended in ethyl acetate and extracted with aqueous potassium bicarbonate solution. The aqueous extract is washed with ether, acidified with 2.5 N hydrochloric acid, saturated with sodium chloride, and the free optically active 4α-hydroxy-3α-methyl-1α,2α-cyclohexanediacetic acid δ-lactone is extracted with ethyl acetate. The extracts are washed with a saturated sodium chloride solution, dried over magnesium sulfate, and evaporated to dryness, affording of crystalline (−) 4α-hydroxy-3α-methyl-1α,2α-cyclohexanediacetic acid, δ-lactone m.p. 118-120.5°C. $[\alpha]_D$ CHCl$_3$ −54.7°.

The first crop of salt crystals may also be recrystallized affording 37.77 g. of crystals m.p. 169°-170.5°C. This salt is treated in a similar manner as above affording (+) 4α-hydroxy-3α-methyl-1α,2α-cyclohexanediacetic acid, δ-lactone m.p. 118°-120.5°C. $[\alpha]_D$ CHCl$_3$ +55°.

What is claimed is:

1. 3α,6,7,7α-Tetrahydro-1α-(loweralkoxycarbonyl)-4-methyl-2-oxindaneheptanoic acid and loweralkyl esters or esters with a loweralkyl group substituted with an aromatic group of from 6 to 10 carbon atoms.

2. The compound of claim 1 in which the lower-alkyl ester is the methyl ester, and the loweralkoxycarbonyl group is the methoxycarbonyl group.

3. The process of preparing the compound of claim 1 in which the diloweralkyl ester or diloweralkyl ester substituted with an aromatic group of from 6 to 10 carbon atoms of 3-methyl-3-cyclohexene-1α,2α-diacetic acid is treated with an alkali metal loweralkoxide in a solvent at from 50°C. to the boiling point of the reaction mixture for from ½ to 3 hours, and subsequently treated with the loweralkyl ester or loweralkyl ester substituted with an aromatic group of from 6 to 10 carbon atoms of ω-iodoheptanoic acid at from 100°-200°C. for from 10 to 30 hours.

4. The process of claim 3 in which the alkali metal loweralkoxide is potassium-t-butoxide.

5. The process of claim 3 in which the solvent is xylene or dimethyl formamide.

* * * * *